(No Model.)
R. J. STIRRAT.
WATER HEATING DEVICE FOR STOVES AND RANGES.
No. 357,874. Patented Feb. 15, 1887.
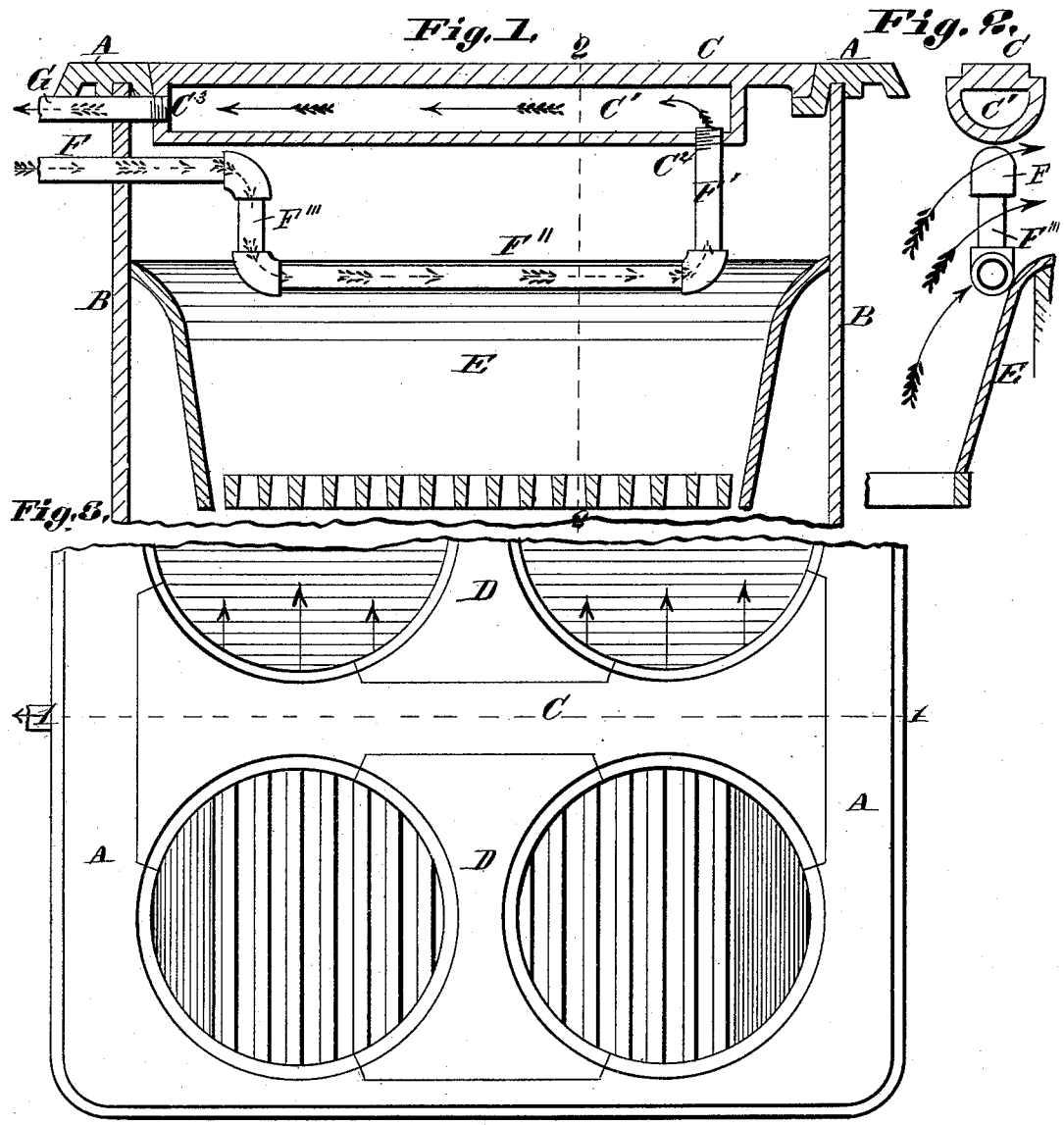

UNITED STATES PATENT OFFICE.

ROBERT J. STIRRAT, OF ST. LOUIS, MISSOURI, ASSIGNOR OF ONE-HALF TO ROBERT G. STIRRAT, OF SAME PLACE.

WATER-HEATING DEVICE FOR STOVES AND RANGES.

SPECIFICATION forming part of Letters Patent No. 357,874, dated February 15, 1887.

Application filed October 23, 1883. Serial No. 109,765. (No model.)

*To all whom it may concern:*

Be it known that I, ROBERT J. STIRRAT, of the city of St. Louis, in the State of Missouri, have invented a certain new and useful Improvement in Water-Heating Devices for Stoves and Ranges, of which the following is a full, clear, and exact description, reference being had to the accompanying drawings, forming part of this specification.

My invention relates to those water-heating devices in which the water to be heated is caused to pass through the long center and a water-back.

My improvement consists in features of construction hereinafter described, and pointed out in the claims.

Figure 1 is a transverse section of a stove at 1 1, Fig. 3, showing a combined long center and water-back. Fig. 2 is a section at 2 2, Fig. 1. Fig. 3 is a part top view of a cooking-stove.

A is the top, and B the side, plates of a stove. C is the long center, and D the short centers. E is the fire-back plate.

The long center C is cast with a projection having a water-passage through it almost from end to end, as shown at C'. The under side of the long center is tapped at $C^2$, and the section F' of the water-pipe screwed therein. This section connects with the horizontal part F'' and vertical section F''' of the induction-pipe F, which extends in front of the fire-back E and out through the wall of the stove or range, and connects with the lower part of a water-heating tank or other source of supply. The eduction-pipe G is screwed into the long center at $C^3$ and carries the water heated therein to the hot-water tank or other place. The arrangement is such that there will be a constant flow of water through the passage C', thus causing the heating of the water and limiting the temperature of the long center.

It will be seen that the construction I have shown provides a combined long center and water-back.

I claim as my invention—

1. The combination, with the removable top plate of a cooking-stove having a chamber therein, of an exit-pipe leading from said chamber at one end of the plate and an inlet-pipe running parallel to the exit-pipe, extending to the other end of the plate and communicating with the chamber, substantially as described.

2. The combination, with the removable top plate of a cooking-stove having a chamber therein, of an exit-pipe leading from said chamber at one end of the plate and an inlet-pipe communicating with the chamber at the other end of the plate and extending downward horizontally and upward beneath the plate, and then parallel to the exit-pipe, substantially as described.

3. The combination, with a cooking stove or range, of a hollow long center plate, supply-pipe F, formed with horizontal section F'', and vertical sections F' F''', and the eduction-pipe G, substantially as described.

ROBERT J. STIRRAT.

Witnesses:
SAML. KNIGHT,
GEO. H. KNIGHT.